_PATENT_

2,778,728
HYDROMETALLURGICAL SEPARATION OF NICKEL AND COBALT

Tuhin K. Roy, Elizabeth, and Harry G. Bocckino, Iselin, N. J., assignors to Chemical Construction Corporation, New York, N. Y., a corporation of Delaware No Drawing. Application June 18, 1954,
Serial No. 437,888

13 Claims. (Cl. 75—119)

This invention relates to cobalt and nickel and more particularly to an improved hydrometallurgical process for the separation of nickel and cobalt from solutions. Still more particularly, it relates to a novel process for separating nickel and cobalt values in solution by preferential chemical reduction.

Conventional pyrometallurgical and electrochemical processes for the separation and recovery of cobalt and nickel from mixed electrolytes are generally unsatisfactory in one or more of the faults of being too complicated, wasteful, or uneconomical or as resulting in products containing undesirably large amounts of the other element. For these reasons, alternate hydrometallurgical processes for the separation of cobalt and nickel from solutions have been given more and more active consideration of late.

One of the better of the recently proposed methods for the preferential reduction of the solutions containing dissolved cobalt and nickel values utilizes the following steps. An aqueous, and usually sulfuric, acid solution containing cobalt, nickel and usually ammonium salts of the acid, is adjusted to the correct degree of acidity. Adjusted solution is then treated under elevated pressure with a non-sulfidizing reducing gas at a temperature above about 325° F. During reduction, additional amounts of a soluble-salt-forming, acid-neutralizing agent, such as ammonia or caustic, may be added to the treated solution.

Nickel may be reduced to metal in more strongly acidic solutions than can cobalt. The total amount of added agent i. e., that during the initial adjustment plus that during treatment, is such as to produce a terminal hydrogen ion concentration at which the nickel reduction reaction comes to equilibrium before more cobalt metal than is desired can be coprecipitated. This treatment precipitates a great deal of the dissolved nickel while leaving the desired amount of cobalt in solution. Precipitated nickel metal powder is separated from the cobalt-containing liquor, dried and utilized. Residual cobalt-bearing liquor may then be further treated with reducing gas at elevated temperature and pressure, usually first to recover nickel-cobalt mixed-metal product and then a cobalt metal product.

The first product from the above-described product process will usually comprise high-purity nickel metal powder, while the last product should comprise a cobalt metal powder containing only a small percentage of nickel. Because the initial precipitation of product grade nickel can be controlled to stop at the desired cobalt content, this portion of the process is quite satisfactory. Unfortunately the final precipitation of substantially-pure cobalt from nickel-bearing liquor is not as sharp and clean as desirable. In practice, this means that more cobalt must be taken in the first step or that an intermediate stage must be carried out to eliminate more of the remaining nickel from solution, necessarily along with a certain amount of cobalt, before taking a cobalt "product." Thus, the intermediate step produces a cobalt-nickel mixed metal. It can be sold as such or recycled to the processing step in which the cobalt and nickel metal values are taken up into solution.

This has been discussed in the proposed process. Unfortunately however, at best it has not been possible in the intermediate step therein to eliminate nickel from solution to below a nickel:cobalt ratio of about 1:50 to about 1:80. Therefore any later-precipitated cobalt product normally must contain one to two percent of nickel. This is a saleable and fully usable but substandard product. It is, therefore, highly desirable to have available a process capable of more complete elimination of nickel from a high-cobalt low-nickel content liquor without undue loss of cobalt itself. Thereby a standard grade cobalt metal product of sufficiently low nickel content can be obtained. This grade requires a nickel-cobalt ratio of about 1:133 or higher. It is, therefore an object of the present invention to develop such a process capable of producing solutions from which cobalt metal powders of standard grades can be precipitated.

Surprisingly, the desired objects of the present invention have been achieved in an effective manner by a simple, direct modification of the known process. An aqueous acid solution containing cobalt, nickel and usually ammonium salts of the acid is treated under reducing conditions and under the correct acidic conditions to precipitate therefrom an initial nickel metal product as in the above-discussed known process.

Also, as in the known process, the nickel content of the solution is reduced as far as practicable, i. e., until the nickel:cobalt mol ratio in solution reaches the range of about 1:50 to 1:80. As metal is precipitated a chemical equivalent of acid is formed and the pH decreases. The 1:50 to 1:80 ratio range will usually occur at an equilibrium acid condition corresponding to about the hydrogen ion content of an aqueous sulfuric acid solution containing about 0.1% free acid or more. This acidity may vary somewhat as will be discussed below.

At about this point, the modification of the present invention comes into use. Sufficient neutralizing agent is added to upset the equilibrium and produce a pH of about 3–5. Reduction is then continued in the stated pH range of 3–5 until the Ni:Co mol ratio in solution is brought down to at least about 1:135, and preferably to 1:250 or less. As metal precipitates acid is formed and neutralizing agent is consumed tending to lower the pH. Yet it must be maintained in the preferred range. This requires carefully controlled further addition of neutralizing agent. When about the desired metal ratio is reached, this addition is stopped, a small amount of additional metal precipitates and due to resultant acid formation the solution at once returns to equilibrium and reduction stops. The slurry is dumped, the mixed metal product being removed and residual liquor of increased cobalt:nickel ratio is treated to precipitate the desired high grade cobalt product.

In essence then, the process of the present invention is an improvement over the hydrometallurgical process described earlier. The present process calls for precise pH control once the Ni:Co mol ratio has been brought in the known way to about the conditions of equilibrium in the range of about 1:50 to 1:80. The present invention involves preventing or upsetting the equilibrium, whereby more nickel can precipitate; controlling the pH at about 3–5 and stopping precipitation when the Ni:Co ratio is above 1:135. This allows the separation and precipitation of the necessary amount of nickel from solution while at the same time retaining the optimum dissolved cobalt content. The present process therefore, now permits producing liquors from which, for the first time, cobalt of the desired high-grades can be precipitated by known methods of hydrometallurgical reduction.

Cobalt metal product recovered from solutions obtained according to the process of the present invention may be readily obtained containing as little as 0.75% Ni which meets specifications for Grade A standard cobalt metal.

If so desired it can be brought as low as 0.15% or even less. There is no particular object in taking the nickel content lower than industrial requirements because producing the extremely low ratios increases the amount of middlings produced. While this is recycled and all cobalt eventually reports as high-grade product, the larger the middling fraction the lower the overall thruput capacity of any given apparatus.

The nature and source of the cobalt and nickel-bearing materials to be treated according to the present process may be widely varied. They will, however, comprise either soluble metal salts, usually sulfates, or compounds easily converted thereto. They may be in solid form or in solution. In the latter case, some purification may be desirable, i. e., filtering, crystallization and redissolving and the like. If solids are to be dissolved an aqueous acid is usually preferable, since the nickel precipitation steps must end and will usually start under acidic conditions.

It should be noted that the terminal acidic conditions for nickel metal or nickel-cobalt mixed metal precipitation steps in the above-discussed known separation process are critical. If the reaction should not be allowed to come to equilibrium at about 0.1% free acid or higher, excessive cobalt would precipitate. Surprisingly this does not occur in the present process. However, in the improvement of the present invention, acidity is also highly important. The critical pH range of 3–5 must be maintained from the time when but for the process of the present invention the initial equilibrium would have been reached at a mol ratio of nickel:cobalt in the range 1:50 to 1:80 until the final desired mol ratio of 1:135 or better is reached. It is important that the pH 3–5 should not be maintained any longer than necessary.

In the initial or first stage reduction of nickel there will be little or no cobalt precipitation above the free acid concentration of about 1.5%. Nickel will initially precipitate down to about 1 g./l. in a 1% acid solution and about 0.2 g./l. in a 0.1% acid solution. From about 1.5% acid up to about 5% acid, nickel precipitates in decreasing yields. Although the lower the acidity the more complete the nickel removal, the lower acidity also tends to cause premature precipitation of cobalt. Accordingly there is for any stated Ni:Co mol ratio in the initial solution some optimum conditions of acidity which can be achieved for substantially complete nickel precipitation while at the same time leaving substantially all the cobalt in solution. It is for this reason that producing but only briefly a pH in the range of about 3–5 becomes critical once the mol ratio of nickel-cobalt falls below about 1:50. If maintained for sufficient time, excessive cobalt precipitation, down to about 10 g./l. at pH 3 and 1 g./l. at pH 5 can occur.

Continuous control may easily be maintained by means of a pH meter adapted to the purpose. In this way the changing pH may be followed down to a pH of 1–2, and then sufficient acid neutralizing agent may be added to produce a pH in the required range of about 3–5.

The reducing gas used in the process of the present invention must be non-sulfidizing. Hydrogen, carbon monoxide and mixtures thereof may be used. Hydrogen where available is definitely preferably. Diluent inert gases do no harm except to unduly increase the requisite total pressures and compressor power consumption. If possible they should be avoided. Reducing gas may be added above the liquid surface during treatment, but the most practical procedure is to feed it in below the surface.

As noted above, during the present process, if uncontrolled, the acid content will rise due to acid formation as metal is precipitated and the solution will come to equilibrium and reaction will stop. Some controlling neutralizing agent must be supplied in controlled amount throughout reduction in order to prevent this. This agent must itself be soluble and must produce only soluble reaction products. Wherever a neutralizing agent is referred to in connection with this step it will be understood that it is meant to be so limited. Ammonia is perhaps the preferred neutralizing agent, although other agents such as caustic alkali may be used. Ammonia may be added per se or as aqua ammonia. The total amount of available ammonia should be such that at the end of the mixed metal reduction cycle the pH will be in the range of 3–5.

The process of the present invention may be conducted by either continuous or batch-wise operation, using controlled content solutions and conditions. In batch-wise operation a timed cycle may be used. For any given solution a few trial runs of the mixed metal reduction will determine a time —NH₃-pH cycle for which reduction of the nickel will be sufficiently complete before cobalt precipitation therewith becomes too great. For continuous operations, a few initial adjustments will establish the conditions at which the necessary feed rates should be maintained for the desired recovery.

The pure nickel metal precipitated in the first step may be recovered in several ways. The metal precipitate may simply be filtered out, washed and dried. Any solids-liquid separation step may be substituted for the filtering operation.

In batch operation seeding is helpful. Some slurry may be retained as a heel in the vessel and additional solution pumped in for the next cycle. If so desired, much or all of the solids may be retained for fifteen or more cycles before removal, only liquor being removed between cycles. In continuous operation it is desirable for the same reasons of seeding that some solids be always present, some solution being continuously fed, some solids and some liquid being continuously withdrawn.

In any case, the final solutions resulting from the intermediate step process of the present invention are readily treated for a cobalt product by known processes of gas reduction. These solutions contain such reduced amounts of nickel that cobalt may obtained therefrom as premium product by substantially complete reduction. Such a process readily produces product cobalt metal powder of greater than 99.2% cobalt content and less than 0.7% Ni.

Washing and drying the various product metal powders produced in conjunction with the process of the present invention are conventional. Preferably at least the finish of the drying step should be carried out in a reducing atmosphere. The washings while dilute may contain valuable materials. These are recovered as by recycling, crystallizing of the salt content by distillation and adsorption of ammonia and the like. These may be done in a conventional manner, and therefore their exact operations also form no part of the present invention. Where the intermediate mixed metal product of the specific step of this invention is saleable, it will be so treated. More often it will be recycled and will not require washing and drying.

While the improved nickel-reducing step of this invention may be applied directly to residual liquors after taking the low-cobalt, high-nickel product, and have been so considered up to this point, this is not necessarily a good practice. It is highly desirable, for economic reasons, that the liquor which is to be treated in the present process contain twenty grams per liter or more of dissolved cobalt. Preferably they should contain at least 25 g./l. of cobalt.

Leach liquors from treating some high cobalt content ores may have this cobalt content, even after removing such extraneous metals as iron or copper and then taking the nickel product according to the above discussed known process. Liquors of lesser cobalt content should be concentrated before using the process of this invention. When working with the illustrative sulfuric acid solutions and the preferred neutralizing agent—ammonia—this will at least remove some of the dissolved ammonium sulfate.

Concentration may be done in any one of several ways. If the ammonium sulfate content is low, for example, simple evaporation by known means is perhaps preferable. If there is a large mol-ratio excess of ammonium salts over those of the residual cobalt and nickel a better procedure is to evaporate the solution until it is concentrated in ammonium sulfate, i. e., contains 10–20% or more up to about saturation. On cooling, double salts of nickel sulfate and/or cobalt sulfate with ammonium sulfate will be precipitated. These can be collected, redissolved in the desired concentration and treated by the present process to reduce the nickel content and obtain a cobalt product. Residual liquor after double salt precipitation can be conventionally processed to recover ammonium sulfate.

The efficacy of the separation is shown in the following example, given for purposes of illustration.

*Example*

Into a 25 gallon autoclave is pumped 15 gallons of a solution containing about 40 g./l. Co, 4 g./l. Ni, and 118 g./l. $(NH_4)_2SO_4$ having a pH of 2.5–3.0. The autoclave is closed, the temperature brought to 325° F. and the clave is pressurized with hydrogen to 600 p. s. i. g. Aqua ammonia (14%) is then pumped into the autoclave at such a rate that when measured at about 30° C. the pH is maintained between 1.0 and 2.0.

When the mol ratio of Ni:Co reaches 1:50, which occurs after about 30 minutes, the pH is carefully maintained between 3 and 4 for a period of about 15 minutes. The rate of aqua ammonia addition during the first part of the run is on the order of 20 ccs. per minute but during the time when the pH is maintained between 3 and 4 the rate of aqua ammonia addition is increased to about 50 ccs. per minute.

At the end of the run the agitator is stopped, the mixed nickel-cobalt metal powder allowed to settle and the liquor discharged through a dip pipe. A fresh batch of head solution is pumped into the autoclave and the run repeated. Most of the liquid is withdrawn, the solids and about three gallons of liquor being carried over after each run. It is found that after about six densifications the rate of reduction at about 325° F. tends to be rather slow. The reduction time is maintained at about 1 hour by raising the temperature of reduction for the later densifications to 350° F. After about fifteen densifications temperature may be raised to 360° F. for maintaining the reduction rate. Total pressure is maintained at about 600 p. s. i. g.

The nickel concentration in the exit liquor in the above runs varies between 0.06–0.16 g./l.

The combined cobalt rich liquors were seeded with about 25 g./l. of fine cobalt powder and reduced at a temperature of about 400° F. under a hydrogen pressure to a total of 700 p. s. i. g. Cobalt powder resulting therefrom was recovered, washed and dried. The final product analyzed 99.2+% cobalt metal and 99.9+% cobalt plus nickel.

We claim:

1. In a hydrometallurgical process for the separation of elemental cobalt from solutions containing dissolved cobalt and nickel, wherein a solution containing cobalt and nickel salts is treated with a non-sulfidizing reducing gas at temperatures above about 250° F., until precipitation of elemental nickel substantially ceases at a hydrogen ion concentration above that equivalent to about that of an aqueous 0.1% free sulfuric acid solution, so-precipitated nickel is removed and residual solution is treated to precipitate cobalt; the improved method of producing elemental cobalt containing not more than 0.75% nickel which comprises the steps of; adding prior to the cobalt precipitation step, sufficient soluble-salt-forming acid-neutralizing agent to the liquor to produce a pH in the range of about 3–5; continuing said treating step at said pH range until the nickel:cobalt mol ratio in solution is less than about 1:133; stopping the addition of neutralizing agent; separating so-precipitated nickel metal from resulting liquor and recovering cobalt from resultant substantially-nickel free liquor.

2. The process according to claim 1 wherein said acid neutralizing agent comprises ammonia.

3. The process according to claim 1 wherein said non-sulfidizing reducing gas comprises hydrogen.

4. The process according to claim 1 wherein said temperature is in the range of about 325°–350° F.

5. The process according to claim 1 wherein said acid solution comprises sulfuric acid.

6. The process according to claim 1 wherein said acid solution comprises sulfuric acid and said acid neutralizing agent comprises ammonia.

7. A process according to claim 1 in which the solution is too dilute in cobalt for effective subsequent recovery of sufficiently pure cobalt wherein said solution to be treated is concentrated to at least about twenty grams per liter of dissolved cobalt.

8. A process according to claim 7 in which after concentration but prior to the said addition of the neutralizing agent the solution is again treated with reducing gas at above about 250° F. until precipitation of nickel ceases at a hydrogen ion concentration above that equivalent to about 0.1% aqueous free sulfuric acid solution.

9. A process according to claim 8 in which reduction is carried out at a temperature of from about 325°–360° F.

10. In the hydrometallurgical process for the recovery of nickel and cobalt from conjoint solutions of their salts containing at least about twenty grams per liter of dissolved cobalt and having a dissolved nickel:cobalt ratio of from about 1:10 to about 1:80; the improved method of producing elemental cobalt which comprises: adjusting said solution to pH of about 3–5 and at above 250° F. and under a positive partial pressure of hydrogen gas, maintaining said pH by addition of soluble-salt-forming, acid-neutralizing agent, whereby precipitation of nickel results; continuing to maintain the solution under said conditions until the resultant dissolved nickel:cobalt ratio is less than 1:133; stopping the addition of neutralizing agent; separating so-precipitated nickel metal from resulting liquor and recovering cobalt from resultant substantially nickel-free liquor.

11. In a hydrometallurgical process for the separation of elemental cobalt from solutions containing dissolved cobalt and nickel, wherein a solution containing cobalt and nickel salts is treated with a non-sulfidizing reducing gas at temperatures above about 250° F., until precipitation of elemental nickel substantially ceases, so precipitated nickel is removed and residual solution is treated to precipitate cobalt, the improved method of producing elemental cobalt containing not more than 0.75% nickel which comprises the steps of: continuing nickel precipitation until concomitant liberation of acid produces a pH of from about 1–2; adding sufficient soluble, salt-forming, acid-neutralizing agent to the liquor to produce a pH in the range of about 3–5; continuing said treatment step at said latter pH range until the nickel:cobalt mol ratio in solution is less than about 1:133; stopping the addition of neutralizing agent; separating so precipitated nickel metal from resulting liquor; and recovering cobalt from resultant substantially nickel-free liquor.

12. The process according to claim 11, wherein said step of separating so precipitated nickel metal from resulting liquor is carried out at a pH at least as acid as a pH of 1 in order that substantially no cobalt can precipitate.

13. The process according to claim 11, wherein said step of separating so precipitated nickel metal from resulting liquor is followed by a second step of removing mixed metal of high cobalt content.

References Cited in the file of this patent

UNITED STATES PATENTS 2,694,005   Schaufelberger _____ Nov. 9, 1954